United States Patent Office 2,789,092
Patented Apr. 16, 1957

2,789,092

DETERGENT LUBRICATING OILS

Troy L. Cantrell, Drexel Hill, Pa., John G. Peters, Audubon, N. J., and Herschel G. Smith, Wallingford, Pa., assignors to Gulf Oil Corporation, Pittsburgh, Pa., a corporation of Pennsylvania No Drawing. Application April 22, 1954,
Serial No. 425,032

5 Claims. (Cl. 252—42.7)

This invention relates to mineral oil lubricant compositions containing detergent additives. As is known in the art, detergent additives are incorporated in mineral oil lubricant compositions to suspend or disperse deterioration products or contaminating materials developed during use of the lubricant, as well as to prevent ring sticking and the formation of engine deposits.

In accordance with our invention, we add to a mineral oil lubricant composition a minor amount, sufficient to confer detergency properties, of an alkaline earth metal salt of a condensation product of 6 mols of a monoalkylated monohydric phenol having at least 4 carbon atoms in the alkyl group, 1 to 2 mols of ammonium hydroxide, 1 to 2 mols of carbon disulfide and 8 mols of formaldehyde. These condensation products are excellent additives, and in addition to conferring detergency properties, act as bearing corrosion and rust inhibitors.

The condensation products of our invention are oil-soluble resinous materials, incorporating in a unitary product alkaline earth metal, sulfur and nitrogen. They are prepared by forming a condensation reaction product of the phenol, ammonium hydroxide, carbon disulfide and formaldehyde in the proportions stated, an alkaline earth metal hydroxide, e. g., calcium, barium, magnesium or strontium hydroxide, being employed in the proportion of 3 mols to obtain the metal salts. Although in preparing the additive the reaction proceeds spontaneously at room temperature, it is preferred to employ moderately elevated temperatures, particularly in the last stages of the reaction. As a final step, the temperature is raised to dehydrate the product, i. e., to distill off the water formed in the reaction and added with the reactants. A dehydration temperature of about 280° F. is suitable. It is advantageous to employ a naphtha or mineral lubricating oil as a reaction medium in order to obtain the final product in the form of a concentrated solution suitable for blending with various mineral oils.

The monohydric monoalkylated phenols employed as a reactant have at least 4 carbon atoms in the alkyl group. For example, such straight and branched chain alkyl groups as butyl, amyl, heptyl, octyl, nonyl, decyl, stearyl, cetyl and the long chain groups derived from paraffin wax are suitable. The alkyl groups containing from 4 to 12 carbon atoms form a preferred class. A preferred phenol is tetramethylbutyl phenol, obtained by the alkylation of phenol with diisobutylene in known manner.

The formaldehyde employed in the condensation reaction is most conveniently used in the form of commercial aqueous formalin, containing 37 percent by weight of formaldehyde. In performing the condensation reaction, it is convenient to disperse or dissove the alkaline earth metal hydroxide either in water or in the aqueous formaldehyde solution.

The following example is illustrative of the preparation of one of the condensation products of this invention. Unless otherwise stated, all parts are by weight.

Example I—Into a reaction vessel, there were charged 36.6 parts of ammonium hydroxide (5N) and 24 parts of carbon disulfide. The mixture was stirred at room temperature for one hour. Then 123.6 parts of tetramethylbutyl phenol and 360 parts of a light lubricating oil having a viscosity of about 155 S. U. S. at 100° F. were added and the mixture agitated under reflux for 5 hours at 180° F. There were then added 76.5 parts of formalin and 22.2 parts of calcium hydroxide in a water slurry. While agitating the mixture, the temperature was gradually raised to 280° F. until all water had been distilled off and the product was dehydrated. Thereafter the solution obtained was filtered. The mineral oil solution of the resin thus prepared had the following properties:

Gravity, °API _____ 22.0
Viscosity, S. U. S. 100° F _____ 1257.
Color, ASTM union _____ 7.0.
Sulfur, B, percent _____ 1.55.
Neutralization No _____ 2.30 alkaline.
Ash as sulfate, percent _____ 1.13.

The metal, sulfur and nitrogen containing resinous condensation products of our invention are excellent addition agents. They are readily soluble in all types of mineral lubricating oils and can be blended with them in high proportions. They confer excellent detergent effects and rust inhibiting properties on the mineral lubricating oils in which they are incorporated, and are good bearing corrosion inhibitors. For these purposes, the condensation products are added to mineral oil lubricants in minor amounts, from about 0.1 to about 25 percent by weight, sufficient to confer improved detergency properties. Generally, the addition of about 1 to 2 percent by weight of the condensation products is sufficient to effect the desired improvement, but for heavy duty applications larger amounts are employed.

In order to illustrate the use of the condensation products of this invention in lubricating oils, a motor lubricating oil was blended with 3 percent by volume of the condensation product prepared according to Example I. Comparative inspections and tests of the identical untreated oil and the treated oil are as follows:

| | Untreated Oil | Treated Oil |
|---|---|---|
| Gravity, ° API | 28.2 | 27.8. |
| Viscosity, S. U. S.: | | |
| 100° F | 556 | 572. |
| 210° F | 66.4 | 67.6. |
| Viscosity Index | 97 | 98. |
| Flash, OC, ° F | 480 | 485. |
| Fire, OC, ° F | 555 | 525. |
| Pour: ° F | −5 | 0. |
| Aging Test, 32° F., 24 Hrs | bright | bright. |
| Room Temp., 15 Days | bright | bright. |
| Color, ASTM Union | 4.75 | 4.74. |
| Appearance | bright | bright. |
| Precipitation No | nil | nil. |
| Copper Strip Tests, 212° F., 3 Hrs | passes | passes. |
| Corrosion Test, ASTM D-665-46 T, Distilled Water: | | |
| Steel Rod, Appearance | rust | bright. |
| Area Rusted, Percent | 100 | 0. |
| Neutralization No | nil | alkaline. |
| Ash as Sulfate, Percent | trace | 0.156. |
| Engine Test, CRC L-4: | | |
| Engine Condition Rating | failed to | 90. |
| Bearing Loss, MG./Whole Bearing | complete. | 10. |

As shown above, the condensation products of this invention confer effective detergency and bearing corrosion inhibiting properties. This is shown under the CRC L-4 test. The improvement in rust inhibiting properties is shown under the Corrosion Test.

While a mineral lubricating oil composition has been shown in the above example, the invention is not to be limited thereto but comprises all mineral oil lubricants to which the condensation products of this invention are added, such as greases and the like. As is known in the art, other additives in addition to the condensation products of our invention can also be employed. Such additives include pour point depressants, viscosity index improvers, antifoam agents, coloring agents, thickeners and the like.

We claim:

1. A lubricant composition comprising a major amount of a mineral lubricating oil and a minor amount, sufficient to confer detergency properties on the composition, of an alkaline earth metal salt of a condensation product of 6 mols of a monoalkylated monohydric phenol having at least 4 carbon atoms in the alkyl group, 1 to 2 mols of ammonium hydroxide, 1 to 2 mols of carbon disulfide and 8 mols of formaldehyde.

2. The composition of claim 1, wherein the monoalkylated phenol contains from 4 to 12 carbon atoms in the alkyl group.

3. The composition of claim 1, wherein the monoalkylated phenol is tetramethylbutyl phenol.

4. The composition of claim 1, wherein the metal salt is present in an amount of from about 0.1 to 25 percent by weight.

5. The composition of claim 1, wherein the alkaline earth metal is calcium.

References Cited in the file of this patent
UNITED STATES PATENTS

| | | |
|---|---|---|
| 2,410,652 | Griffin et al. | Nov. 5, 1946 |
| 2,647,873 | Matthews et al. | Aug. 4, 1953 |

UNITED STATES PATENT OFFICE
CERTIFICATE OF CORRECTION

Patent No. 2,789,092                                    April 16, 1957

Troy L. Cantrell et al.

It is hereby certified that error appears in the printed specification of the above numbered patent requiring correction and that the said Letters Patent should read as corrected below.

Column 1, line 66, for "dissove" read -- dissolve --; column 2, second table, under the heading "Treated Oil", tenth item thereof, for "4.74" read -- 4.75 --.

Signed and sealed this 6th day of August 1957.

(SEAL)

Attest:
KARL H. AXLINE

Attesting Officer

ROBERT C. WATSON
Commissioner of Patents